United States Patent Office 3,780,190
Patented Dec. 18, 1973

3,780,190
ARTIFICIAL SWEETENING COMPOSITION
Paul Kracauer, New York, N.Y., assignor to American Sweetener Corp., New York, N.Y.
No Drawing. Filed May 3, 1971, Ser. No. 139,838
Int. Cl. A23l 1/26
U.S. Cl. 426—213                                         4 Claims

ABSTRACT OF THE DISCLOSURE

An essentially non-caloric artificial sweetening composition comprises a minor amount of a soluble saccharin compound and a major amount of a soluble citrate as an extender and de-bittering agent. The flavor of the composition may be further enhanced by the addition of small amounts of d-galactose, acidic buffering agents and alkaline chlorides.

---

The present invention relates to artificial sweetening compositions. More particularly, the present invention is concerned with novel, low calorie artificial sweetening compositions which employ soluble saccharin compounds as the source of sweetness.

The utilization of saccharin as an artificial sweetener is well known in the art. While this compound is advantageously used in lieu of sugar as a low calorie sweetener, it has been characterized by a bitter aftertaste. Attempts have been made to overcome this objectionable aftertaste by combining saccharin with blocking or flavoring agents. However, such combinations have the effect of diminishing the sweetening power of saccharin.

Until recently, the bitter aftertaste of saccharin had been successfully masked by combining saccharin with cyclamates. However, the use of cyclamates has recently been banned as a health hazard. More recently, attempts have been made to overcome the bitter aftertaste of saccharin by combining it in a granular form, with various extenders and other ingredients. The ability to prepare such sweetening compositions in granular form is commercially important since they are normally packaged and dispersed in single dosage envelopes. While such attempts have had limited success in covering the typical bitter aftertaste of saccharin, the extenders and fillers used to produce such sweetening compositions add a significant amount of calories, e.g. 3 or more calories per single serving, to the sweetening composition thereby defeating the primary purpose for using artificial sweeteners.

It is an object of the present invention to provide a novel, low calorie artificial sweetening composition.

It is another object of the present invention to provide a novel, low calorie sweetening composition employing saccharin as the main source of sweetener.

Yet another object of the present invention is to provide a novel, low calorie sweetening composition which employs saccharin, but which lacks the aftertaste normally associated with this compound.

The above and other objects of the invention are achieved by a novel composition comprising the combination of a minor amount of a soluble saccharin compound as a sweetening agent and a major amount of a soluble citrate as an extender and de-bittering agent. It has been discovered that soluble citrates, and particularly sodium and potassium citrate, are capable of eliminating the bitter aftertaste associated with saccharin. In addition, since these compounds are non-caloric, i.e. they produce no calories derived from carbohydrates, protein or fat, they are extremely suitable for use as extenders and bulking agents in preparing single dosages of artificial sweetener.

The soluble citrates which are employed in the composition of the invention are alkaline materials having a pH of eight or more. Consequently, when these materials are combined with soluble saccharin compound, e.g. sodium, calcium or potassium saccharin in accordance with the invention and dissolved in liquids, a slight alkaline taste may be imparted. In accordance with a further feature of the invention, such alkalinity may be overcome by the inclusion of minor amounts of acidic buffering materials to the composition. Suitable acidic buffering agents include organic plant acids, soluble acid phosphates or combinations thereof. Typical materials which may be employed in the composition include tartaric acid, fumaric acid, maleic acid, citric acid, calcium monophosphate, sodium monophosphate, and potassium monophosphate. Particularly preferred ingredients are fumaric acid, tartaric acid and calcium monophosphate or combinations thereof.

It is a further feature of the invention that selected additional ingredients may be employed, either alone or in combination, to produce an artificial sweetening composition having an enhanced flavor. Such additional ingredients have been described in my copending, commonly assigned U.S. application Ser. No. 76,216, filed Sept. 28, 1970 and entitled "Artificial Sweetening Composition." Thus, for example, it has been found that the addition of minute amounts of d-galactose to the above described composition may assist in further elimination of the bitter aftertaste of saccharin, as well as the enhancement of the flavor of the composition. In addition, the inclusion of minor amounts of alkaline chloride, particularly sodium or potassium chloride or combinations thereof, to the composition has been found to assist in the creation of a more sugar-like taste in foods and drinks.

The novel compositions of the present invention comprise the following formulation, the ranges given with each ingredient representing the relative amounts in parts by weight for each of the ingredients in the composition of the invention. Ordinarily, these ingredients will be combined into single dosage servings weighing approximately 0.4 to 0.8 gram, e.g. 0.5 gm. However, it will be evident to those persons skilled in the art that the composition will be formulated in larger quantities in the same relative ratios.

| Ingredient | Parts Broad range | Preferred range |
|---|---|---|
| Soluble citrate | 300–700 | 400–600 |
| Soluble saccharin | 25–60 | 30–50 |
| Acid buffering agent | 0–10.0 | 1–8.0 |
| d-Galactose | 0–5.0 | 0.5–3.0 |
| Alkaline | 0–2.0 | 0.5–1.5 |

Although the composition of the invention may be formulated by skillfully blending the materials into a uniform mix, the preferred method of formulation is a conventional wet granulation technique. The wet granulation technique results in a fluffier composition which offers more volume and consequently is more convenient to dispense. In the typical wet granulation technique, all of the ingredients are carefully mixed and thereafter are wet granulated using about 1 to 2% of a 50% alcohol solution. The wet granulated mixture is then dried at low temperature and sifted to obtain the desired uniform crystal granulate.

The characteristics of the present invention will be further understood by reference to the following illustrative examples.

EXAMPLE 1

The following ingredients are skillfully mixed and uniformly blended:

|  | Grams |
|---|---|
| Soluble saccharin | 3.2 |
| Sodium citrate | 50 |
| Fumaric acid | 0.8 |
| Potassium chloride | 0.2 |
| Sodium chloride | 0.1 |

Approximately 0.55 gram of this mixture is equivalent in sweetening power to about 2 teaspoons of sugar. It is completely and instantly soluble in cold and hot foods and drinks and does not have a bitter aftertaste.

EXAMPLE 2

The following ingredients were uniformly mixed and blended:

| | Grams |
|---|---|
| Sodium citrate | 45 |
| Soluble saccharin | 3.3 |
| Calcium monophosphate | .1 |
| Sodium chloride | .1 |
| d-Galactose | .5 |

Approximately 0.5 gram of this mixture is equivalent in sweetening power to about 2 teaspoons of sugar.

EXAMPLE 3

The following ingredients were uniformly mixed and blended:

| | Grams |
|---|---|
| Sodium citrate | 45 |
| Soluble saccharin | 3.6 |
| Fumaric acid | .7 |
| Calcium monophosphate | .1 |
| d-Galactose | .2 |

Approximately 0.5 gram of this compound is equal in sweetening power to about 2 teaspoons of sugar.

EXAMPLE 4

The following ingredients were uniformly mixed and blended:

| | Grams |
|---|---|
| Sodium citrate | 55 |
| Soluble saccharin | 4 |
| Fumaric acid | 1 |
| d-Galactose | .3 |
| Sodium chloride | .2 |

Approximately 0.6 gram of this mixture is equivalent in sweetening power to about 2 teaspoons of sugar.

EXAMPLE 5

The following ingredients were uniformly mixed and blended:

| | Grams |
|---|---|
| Sodium citrate | 50 |
| Soluble saccharin | 3.3 |
| d-Galactose | .2 |
| Tartaric acid | .8 |
| Potassium chloride | .2 |

Approximately 0.55 gram of this mixture is equal in sweetening power to 2 teaspoons of sugar.

Having thus described the general nature as well as specific embodiments of the invention, the true scope will now be pointed out in the appended claims.

What is claimed is:

1. An artificial sweetening composition consisting essentially of 25 to 60 parts of soluble saccharin, 300 to 700 parts of a soluble citrate compound, and 1 to 10 parts of an acidic material selected from the group consisting of fumaric acid, tartaric acid, monophosphate salts, and combinations thereof.

2. The composition of claim 1 further including 0.5 to 5 parts of d-galactose.

3. The composition of claim 1 further including 0.5 to 2.0 parts of an alkaline chloride selected from the group consisting of sodium and potassium chloride.

4. The composition of claim 1 wherein said soluble citrate is selected from the group consisting of sodium citrate and potassium citrate.

References Cited

UNITED STATES PATENTS

| 3,285,751 | 11/1966 | Kracauer | 99—141 |
| 2,968,566 | 1/1961 | Munch | 99—143 |
| 3,667,969 | 6/1972 | Kracauer | 99—141 A |
| 3,506,453 | 4/1970 | McCarron | 99—78 |

RAYMOND N. JONES, Primary Examiner

U.S. Cl. X.R.

426—217